United States Patent
Dürre et al.

(10) Patent No.: US 10,590,983 B2
(45) Date of Patent: Mar. 17, 2020

(54) ELASTOMERIC BODY FOR A SHAFT BEARING AND SHAFT BEARING

(71) Applicant: VIBRACOUSTIC GMBH, Darmstadt (DE)

(72) Inventors: Markus Dürre, Neuenburg Am Rhein (DE); Christian Paul, Auggen (DE); Markus Endhart, Staufen (DE)

(73) Assignee: VIBRACOUSTIC GMBH, Darmstadt (DE)

( * ) Notice: Subject to any disclaimer, the term of this patent is extended or adjusted under 35 U.S.C. 154(b) by 0 days.

(21) Appl. No.: 16/344,869

(22) PCT Filed: Oct. 23, 2017

(86) PCT No.: PCT/EP2017/077038
§ 371 (c)(1),
(2) Date: Apr. 25, 2019

(87) PCT Pub. No.: WO2018/077820
PCT Pub. Date: May 3, 2018

(65) Prior Publication Data
US 2019/0264736 A1    Aug. 29, 2019

(30) Foreign Application Priority Data
Oct. 26, 2016    (DE) .................. 10 2016 120 458

(51) Int. Cl.
| | | |
|---|---|---|
| F16C 17/02 | (2006.01) | |
| F16C 33/20 | (2006.01) | |
| F16C 27/06 | (2006.01) | |

(52) U.S. Cl.
CPC .......... F16C 17/02 (2013.01); F16C 27/066 (2013.01); F16C 33/20 (2013.01)

(58) Field of Classification Search
CPC ...... F16C 17/02; F16C 33/20; F16C 2326/06; F16C 27/066; B60K 17/24
See application file for complete search history.

(56) References Cited

U.S. PATENT DOCUMENTS

| | | | | |
|---|---|---|---|---|
| 2,906,572 A | * | 9/1959 | Wroby ................. | B60K 17/24 384/536 |
| 2,933,354 A | * | 4/1960 | Primeau ............... | B60K 17/24 384/536 |

(Continued)

FOREIGN PATENT DOCUMENTS

| | | |
|---|---|---|
| DE | 1525034 B | 9/1969 |
| DE | 281018 * | 6/1979 |

(Continued)

OTHER PUBLICATIONS

Machine Translation of DE 281018 (Year: 1979).*
International Search Report, PCT/EP2017/077038, filed Jan. 18, 2018.

*Primary Examiner* — Alan B Waits
(74) *Attorney, Agent, or Firm* — Fishman Stewart PLLC

(57) ABSTRACT

An elastomeric body for a shaft bearing of a motor vehicle is suitable for arrangement in a gap between a bearing support and an inner body. The elastomeric body includes a first attachment leg, a second attachment leg, and a connecting portion interconnecting the first and second attachment legs. In embodiments, at least one of the first and second attachment legs has a plug-on groove that can be plugged onto the bearing support or the inner body in a form-fitting and/or force-fitting manner such that the plug-on groove encompasses the bearing support or the inner body. Embodiments of the concept further relate to a shaft bearing for a shaft of a motor vehicle.

9 Claims, 2 Drawing Sheets

(56) References Cited

U.S. PATENT DOCUMENTS

| | | | |
|---|---|---|---|
| 3,306,679 A | 2/1967 | Stokely | |
| 3,639,015 A * | 2/1972 | Maas | B60K 17/24 384/536 |
| 3,961,829 A * | 6/1976 | Bowen | F16C 27/066 384/536 |
| 8,851,759 B2 * | 10/2014 | Bussit | F16C 19/06 384/536 |
| 2002/0131660 A1 * | 9/2002 | Bade | F16C 27/066 384/536 |
| 2007/0172167 A1 * | 7/2007 | Lew | B60K 17/24 384/536 |
| 2008/0095484 A1 * | 4/2008 | Wirges | F16C 27/066 384/536 |
| 2009/0214145 A1 * | 8/2009 | Cislo | F16C 35/04 384/208 |
| 2013/0068921 A1 * | 3/2013 | Ikeda | F16C 35/04 248/635 |
| 2013/0178298 A1 * | 7/2013 | Hatogai | F16C 3/02 464/179 |
| 2016/0075231 A1 * | 3/2016 | Mori | B60K 17/24 248/674 |
| 2017/0253117 A1 * | 9/2017 | Oomiya | B60K 17/24 |
| 2018/0334030 A1 * | 11/2018 | Seipel | B60K 17/24 |

FOREIGN PATENT DOCUMENTS

| | | |
|---|---|---|
| DE | 4320642 C1 | 1/1995 |
| DE | 202006008365 U1 | 8/2006 |
| DE | 102007037401 A1 | 2/2009 |
| DE | 102008037786 A1 | 3/2009 |
| DE | 102013006732 A1 | 10/2013 |
| DE | 102014107477 A1 | 12/2015 |
| JP | S6418629 U | 1/1989 |
| JP | 201399995 A | 5/2013 |
| WO | 2008125792 A1 | 10/2008 |

* cited by examiner

ELASTOMERIC BODY FOR A SHAFT BEARING AND SHAFT BEARING

CROSS-REFERENCE TO RELATED APPLICATIONS

This application is a National Stage Patent Application of International Patent Application No. PCT/EP2017/077038, filed Oct. 23, 2017, which claims the benefit of German Application Serial No. 10 2016 120 458.7, filed Oct. 26, 2016, the contents of each are incorporated by reference in their entireties.

TECHNICAL FIELD

The present invention relates to an elastomeric body for a shaft bearing of a motor vehicle, which can be arranged in a gap between a bearing support and an inner body. Further, the invention relates to a shaft bearing with such an elastomeric body.

BACKGROUND

Shaft bearings of the aforementioned type are used for supporting a shaft such as a cardan shaft of a motor vehicle. The shaft bearing serves to keep the cardan shaft exactly in position during driving and to compensate for axial displacements when starting and braking. In addition, the shaft bearing isolates noise and dampens resonant frequencies and wobbling movements of the cardan shaft.

For this purpose, the shaft bearing is coupled via the inner body to the shaft, so that vibrations of the shaft are introduced into the shaft bearing. As a result, the elastomeric body begins to vibrate and dampens and/or isolates the vibrations introduced into the shaft bearing. The fixing of the shaft bearing on a motor vehicle part, in particular the vehicle body, takes place via the outer body.

From the DE 43 20 642 C1 a shaft bearing is disclosed having a rolling bearing and a bearing support surrounding the rolling bearing at a radial distance. An integrally formed elastomeric body having a substantially U-shaped cross-sectional profile and an annular inner and outer bead are disposed between the rolling bearing and the bearing support. The elastomeric body is connected to the bearing support via its outer bead in a form-fitting and removable manner by engaging a beading formed on the end face of the bearing support with a circumferential notch introduced into the outer bead.

Further, DE 10 2014 107 477 A1 discloses a shaft bearing with a bearing support, a rolling bearing and an elastomeric body arranged between the bearing support and the rolling bearing, wherein the elastomeric body is secured to the bearing support by means of a securing ring.

SUMMARY

An object of the present invention is to provide an elastomeric body and a shaft bearing, which enable an improved attachment of the elastomeric body to a bearing support and/or an inner body.

To solve the problem, an elastomeric body with the features according to claim 1 as well as a shaft bearing with the features according to claim 10 are proposed.

Advantageous embodiments of the elastomeric body and the shaft bearing are subject of the respective dependent claims.

According to a first aspect, an elastomeric body for a shaft bearing of a motor vehicle is proposed, which can be arranged in a gap between a bearing support and an inner body, comprising a first attachment leg, a second attachment leg and a connecting portion interconnecting the two attachment legs, wherein at least one of the attachment legs has a plug-on groove which can be plugged onto the bearing support or the inner body in a form-fitting and/or force-fitting manner such that the plug-on groove encompasses the bearing support or the inner body. By plugging the plug-on groove onto the bearing support and/or the inner body a simple and inexpensive attachment of the elastomeric body to the bearing support and/or the inner body is created. Moreover, it is possible to attach the elastomeric body to a bearing support or an inner body, which are made as an extruded profile. In addition, a subsequent processing of the bearing support and/or the inner body can be omitted. Encompassing in the context of the invention refers to the plug-on groove abutting against the end faces of the bearing support or the inner body. Advantageously, the width of the plug-on groove corresponds to the width of the bearing support and/or the width of the inner body. Further advantageously, the plug-on groove abuts against the radially inner circumferential surface of the bearing support and/or the radially outer circumferential surface of the inner body and the end faces of the bearing support and/or the inner body. Advantageously, the inner body is designed as a rolling bearing. The connecting portion may be formed as a fold, in particular a rolled fold. A portion of the elastomeric body may be disposed outside the gap in the axial direction. In particular, the connecting fold forming a rolled fold can be arranged outside the gap in the axial direction.

In an advantageous embodiment, the plug-on groove has a first leg, a second leg and a base interconnecting the two legs. In particular, the plug-on groove encompasses the bearing support or the inner body by enclosing either of them in the plug-on groove. Thus the base abuts against the radially inner circumferential surface of the bearing support and/or the radially outer circumferential surface of the inner body and the two legs abut against the end faces of the bearing support and/or the inner body. The two legs and the base can be integrally formed and made of the same material from the attachment leg. The base may be pivotable with respect to the attachment leg.

Advantageously, a distance between the inner sides of the legs is smaller than a width of the bearing support and/or a width of the inner body. As a result, a bias in the axial direction can be generated in order to plug the plug-on groove onto the bearing support and/or the inner body in a force-fitting manner and to fix it.

Advantageously, the base has a first base portion and a second base portion, wherein the second base portion is pivotable with respect to the attachment leg. As a result, the plug-on groove is uncoupled from the elastomeric body in order to maintain the freedom of movement of the elastomeric body, in particular of the connecting portion. Moreover, it is possible to widen the plug-on groove over the entire length of the bearing support or the inner body to plug on the bearing support and/or the inner body in a form-fitting and/or force-fitting connection.

In an advantageous embodiment, the second base portion protrudes at an angle from the attachment leg. As a result, the second base portion and the leg attached thereto are pivotable relative to the first base portion, so that the plug-on groove is expandable and adaptable to the contour thereof over the entire length of the bearing support and/or the inner body.

In an advantageous embodiment, at least one recess is formed in corners of the plug-on groove. The recesses prevent sharp edges of the bearing support and/or the inner body from cutting into the corners of the plug-on groove thus leading to a damage of the elastomeric body. Advantageously, the recesses are introduced during the manufacture of the elastomeric body, in particular during extrusion or injection molding. Advantageously, the recesses are introduced into the inner sides of the legs.

In an advantageous embodiment, the elastomeric body has an outer diameter which is larger than an inner diameter of the bearing support and that the elastomeric body has an inner diameter which is smaller than an outer diameter of the inner body. As a result, a massive increase in the radial overlap of the vulcanized elastomeric body and the inner diameter of the bearing support or the outer diameter of the inner body is created. As a result of this massive increase in the radial overlap, the elastomeric body has an excess and can thus be arranged with a radial bias between the bearing support and the inner body. Furthermore, a safety clip or a retaining ring for attachment of the elastomeric body within the gap can be omitted.

Advantageously, at least one of the attachment legs has a bushing. The bushing causes a uniform surface pressure and thus a uniform force distribution on the bearing support or the inner body. Advantageously, the bushing is vulcanized into the elastomeric body. The connection of the bushing with the elastomeric body can be done in a form-fitting manner and/or using bonding means. In a form-fitting connection, openings are introduced into the bushing, which are penetrated by the elastomer of the elastomeric body. Advantageously, the inner bushing is vulcanized into the radially inner attachment leg.

In an advantageous embodiment, at least one of the attachment legs has a rubber abutment. The rubber abutment serves to dampen the radial movement of the two attachment legs. Advantageously, the at least one rubber abutment protrudes at an angle from one of the attachment legs. Depending on the choice of the angle different biases of the rubber abutment and thus different damping characteristics can set. Advantageously, the at least one rubber abutment protrudes radially inwardly from the radially outer attachment leg.

According to a further aspect, a shaft bearing for a shaft, in particular a cardan shaft, of a motor vehicle is proposed, comprising an inner body, a bearing support attachable to a motor vehicle part and which forming a gap surrounds the inner body, and an elastomeric body. The elastomeric body is held within the gap in a form-fitting and/or force-fitting manner by plugging the elastomeric body using its at least one plug-on groove onto the bearing support and/or the inner body in a form-fitting and/or force-fitting manner such that the plug-on groove encompasses the bearing support or the inner body.

In an advantageous embodiment, the bearing support or the inner body is made of an extruded profile or plastic. A bearing support or an inner body formed as an extruded profile is inexpensive to manufacture. For this purpose, the bearing support or the inner body is extruded and sawn to length. Advantageously, the bearing support or the inner body is made of an extruded aluminum profile.

BRIEF DESCRIPTION OF THE DRAWINGS

The elastomeric body and the shaft bearing as well as further features and advantages will be explained in greater detail below based on exemplary embodiments, which are shown schematically in the figures. Hereby.

DETAILED DESCRIPTION

Figure 1:
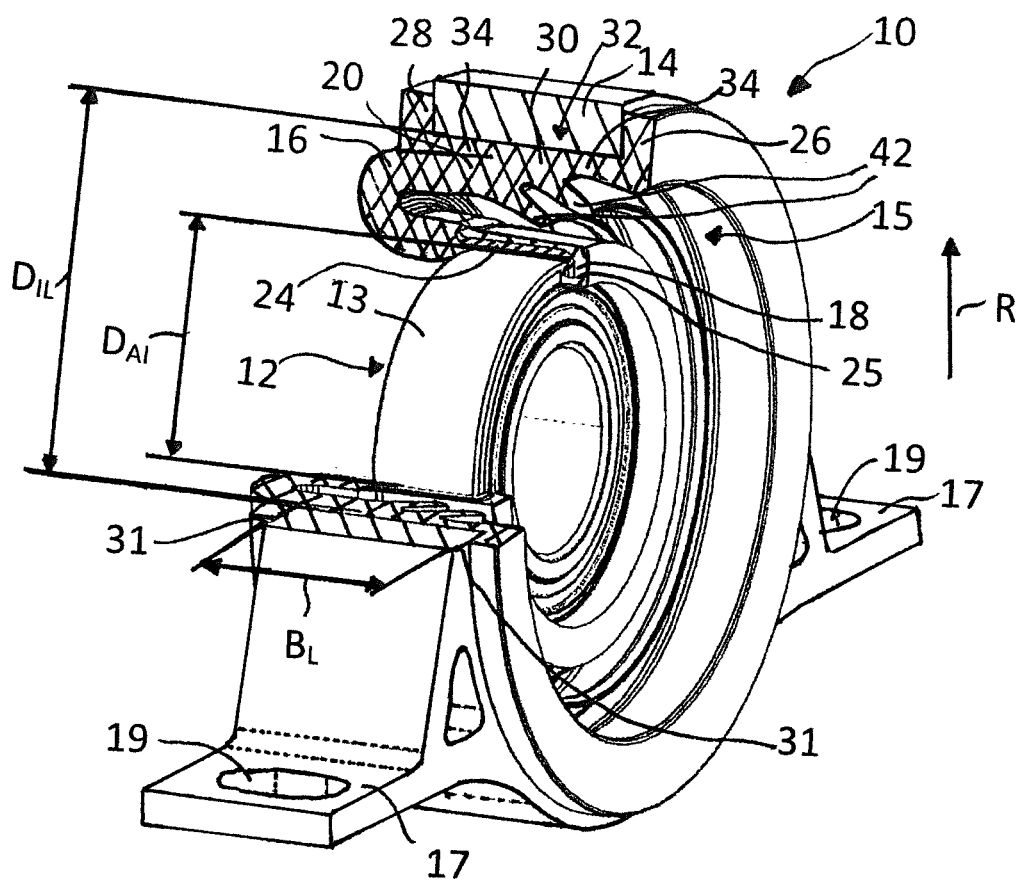
FIG. 1 shows in partial section a shaft bearing with an elastomeric body according to a first embodiment.

In FIG. 1, a shaft bearing 10 is shown, which serves for supporting a shaft, not shown, in particular a cardan shaft of a motor vehicle.

The shaft bearing has an inner body 12, which, at present, is designed as a rolling bearing 13, and a bearing support 14 which forming a gap 15 surrounds the inner body 12. Within the gap 15, an elastomeric body 16 is arranged, which connects the inner body 12 elastically with the bearing support 14.

The bearing support 14 is made of an extruded profile, in particular an extruded aluminum profile, and serves for attachment of the shaft bearing 10 to a motor vehicle part, not shown. For this purpose, the bearing support 14 has protruding attachment flanges 17 with openings 19 introduced therein for screwing to a motor vehicle part, not shown. In addition, the bearing support can also be made of plastic.

Figure 2:
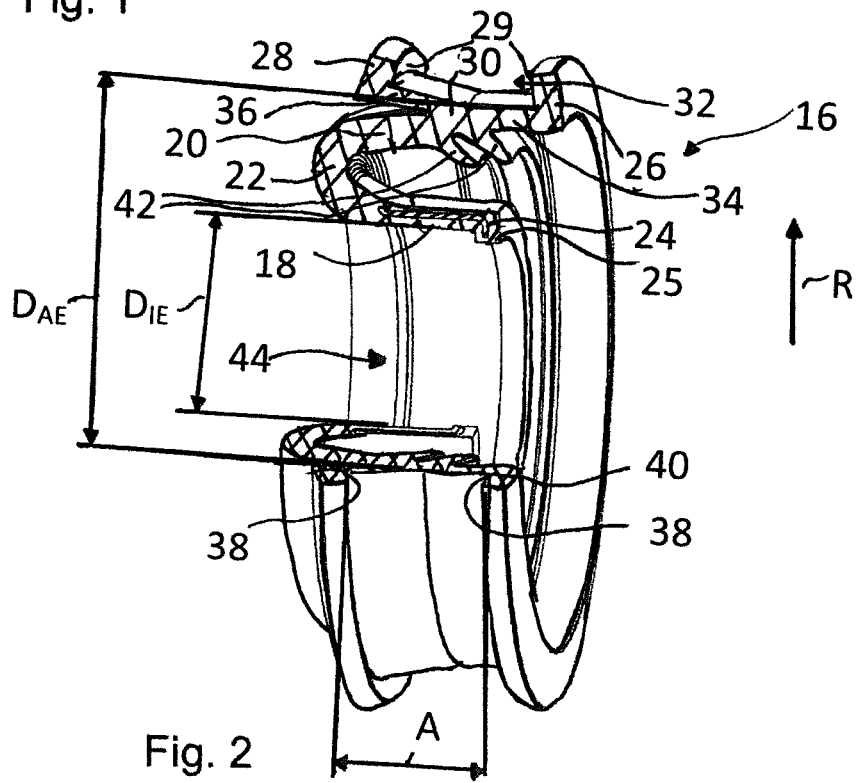
FIG. 2 shows in partial section the elastomeric body according to the first embodiment.

As can be seen in FIG. 2, the elastomeric body 16 is approximately U-shaped in cross-section and has a first attachment leg 18, a second attachment leg 20 and a connecting portion 22 interconnecting the two attachment legs 18, 20.

According to FIG. 1, the second attachment leg 20 abuts against the rolling bearing 13, wherein a bushing 24 is introduced into the second attachment leg 20 to increase the surface pressure. The bushing 24 may be connected to the elastomeric body 16 in a form-fitting manner and/or be bonded thereto using a binder. To achieve a form-fitting connection, the inner bushing 24 may be provided with openings through which the elastomer of the elastomeric body 16 can pass. At its free end, the second attachment leg 20 has a shoulder 25 against which the rolling bearing 13 abuts and which serves for the axial locking of the rolling bearing 13.

The connecting portion 22 is U-shaped and forms a fold, in particular a rolled fold, wherein the connecting portion 22 elastically and resiliently interconnects the two attachment legs 18, 20.

As seen in FIG. 2, the first attachment leg 18 has a plug-on groove 32 for plugging onto the bearing support 14 in a form-fitting and/or force-fitting manner. The plug-on groove 32 has a first leg 26, a second leg 28, and a base 30 interconnecting the two legs 26, 28. The inner sides 29 of the legs 26, 28 abut against the end faces 31 of the bearing support 14 in the plugged state. Since a distance A between the inner sides 29 of the legs 26, 28 is smaller than a width BL of the bearing support 14, the plug-on groove 32 is held with an axial bias on the bearing support 14.

As further shown in FIG. 2, the base 30 has a first base portion 34 and a second base portion 36. The first base portion 34 is an extension of the first attachment leg 18. The second base portion 36 protrudes at an angle from the first attachment leg 18 and is pivotable relative to the first attachment leg 18 and the first base portion 34, respectively.

For this reason, the plug-on groove 32, in particular a portion of the plug-on groove 32, from the elastomeric body 16, in particular from the connecting portion 22 forming a fold, is decoupled, so that the freedom of movement of the elastomeric body 16 is maintained.

Further, as seen in FIG. 2, a recess 40 is introduced into the corners 38 of the receiving plug-on groove 32, which prevent cutting sharp edges of the bearing support 14 in the elastomeric body 16.

In addition, the first attachment leg 18 has two radially inwardly protruding rubber abutments 42. The rubber abutments 42 serve to dampen the movement of the second attachment leg 20 in the radial direction R. For this purpose, the two rubber abutments 42 protrude at an angle from the first attachment leg 18. Depending on the choice of the angle, the bias of the rubber abutments 42 and thus the damping characteristic can be adjusted.

The elastomeric body 16 has an outer diameter DAE, which is greater than an inner diameter DIL of the bearing support 14. Further, the elastomeric body 16 has an inner diameter DIE, which is smaller than an outer diameter DAI of the inner body 12. As a result, a massive increase in the radial overlap of the elastomeric body 16 with the inner diameter DIL of the bearing support 14 and the outer diameter DAI of the inner body 12 is created. As a result of this massive increase in the radial overlap, the elastomeric body 16 is held with a radial bias between the bearing support 14 and the inner body 12.

Hereinafter, a method of assembling the shaft bearing 10 will be described. For this purpose, the rolling bearing 13 is first inserted into the receiving opening 44 formed by the second attachment leg 20 in such a way that the rolling bearing 13 abuts against the shoulder 25. Since the elastomeric body 16 R has an extension which is larger than the gap 15 in the radial direction, it is necessary to compress the elastomeric body 16 in order to insert the elastomeric body 16 into the bearing support 14. In the compressed state, the plug-on groove 32 is then plugged onto the bearing support 14.

Hereinafter, another embodiment of the elastomeric body is described, whereby previously used reference numerals are used for the description of the same or functionally identical parts.

Figure 3:
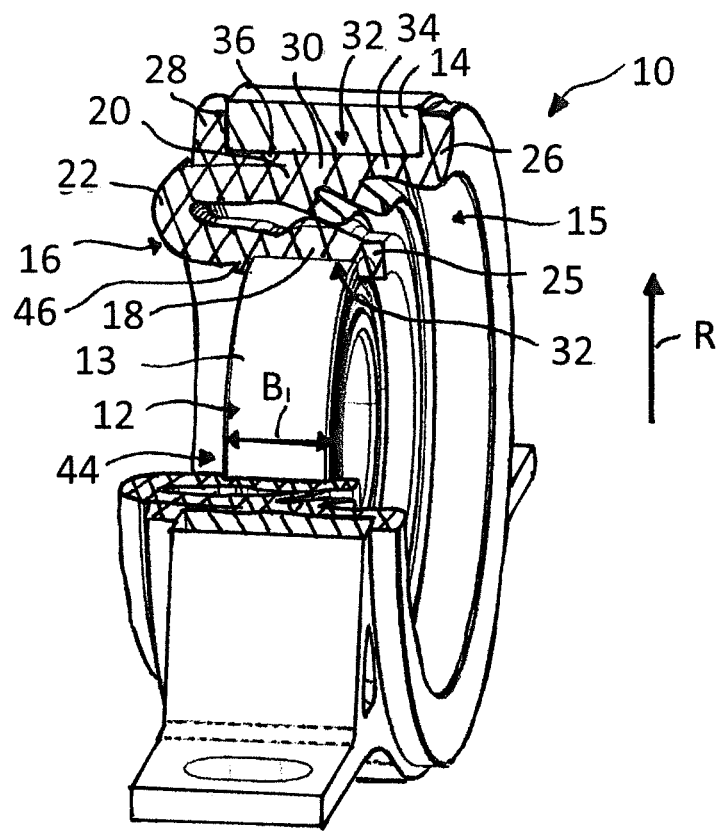
FIG. 3 shows in partial section a shaft bearing with an elastomeric body according to a second embodiment.
Figure 4:
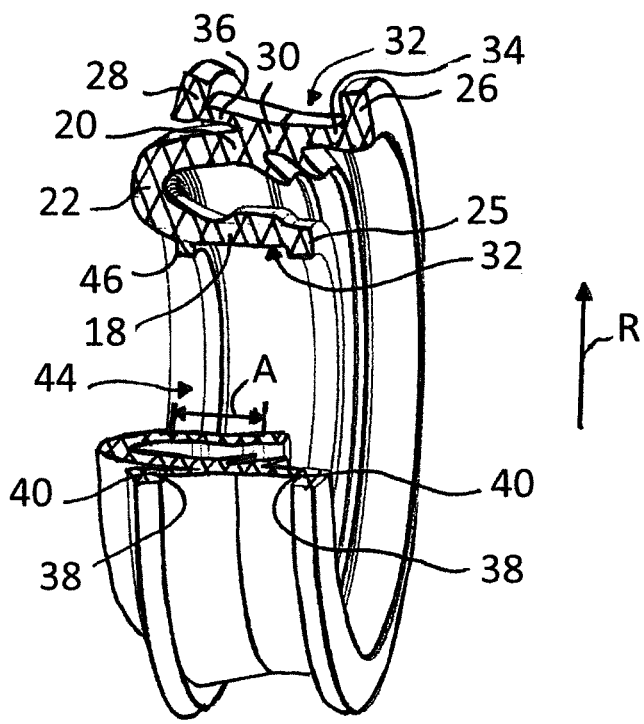
FIG. 4 shows in partial section the elastomeric body according to the second embodiment.

In the FIGS. 3 and 4 a second embodiment of the elastomeric body 16 is shown which differs from the first embodiment in that the second attachment leg 20 has a further plug-on groove 32 instead of a bushing for fixing to the rolling bearing 13. According to FIG. 3, the plug-on groove 32 is formed from the second attachment leg 20 which forms the base 30, the shoulder 25 which forms the first leg 26, and a shoulder 25 which forms the second leg 28 and which is opposite the protrusion 46.

Since a distance A between the inner sides 29 of shoulder 25 and the protrusion 46 is smaller than a width BI of the inner body 12, here the rolling bearing 13, a bias is generated in the axial direction so that the receiving groove 32 can be plugged onto the rolling bearing 13, in particular its outer sleeve, in a form-fitting and/or force-fitting manner. The assembly of the shaft bearing 10 with the elastomeric body 16 according to the second embodiment is otherwise in the same way as described above.

The invention claimed is:

1. An elastomeric body for a shaft bearing of a motor vehicle, the elastomeric body configured for arrangement in a gap between a bearing support and an inner body, and the elastomeric body comprising:
a first attachment leg,
a second attachment leg, and
a connecting portion interconnecting the first and second attachment legs,
wherein at least one of the first and second attachment legs has a plug-on groove which can be plugged onto the bearing support or the inner body manner such that the plug-on groove encompasses the bearing support or the inner body; the plug-on groove has a first leg, a second leg, and a base interconnecting the first and second legs; the base has a first base portion and a second base portion; and the second base portion is pivotable with respect to the first base portion to widen the plug-on groove over an entire length of the bearing support or the inner body to plug on the plug-on groove onto the bearing support or the inner body in a form-fitting and/or force-fitting manner.

2. The elastomeric body according to claim 1, wherein a distance A between inner sides of the first and second legs is smaller than a width BL of the bearing support and/or a width BI of the inner body.

3. The elastomeric body according to claim 1, wherein the second base portion protrudes at an angle from the first attachment leg or the second attachment leg.

4. The elastomeric body according to claim 1, wherein at least one recess is introduced into corners of the plug-on groove.

5. The elastomeric body according to claim 1, wherein the elastomeric body has an outer diameter DAE which is larger than an inner diameter DIL of the bearing support and that the elastomeric body has an inner diameter DIE which is smaller than an outer diameter DAI of the inner body.

6. The elastomeric body according to claim 1, wherein at least one of the attachment legs has a bushing.

7. The elastomeric body according to claim 1, wherein one of the attachment legs has at least one protruding rubber abutment.

8. A shaft bearing for a shaft of a motor vehicle, the shaft bearing comprising: an inner body, a bearing support forming a gap that surrounds the inner body and is attachable to a motor vehicle part, and an elastomeric body according to claim 1.

9. The shaft bearing according to claim 8, wherein the bearing support or the inner body is made of plastic or an extruded profile.

* * * * *